US006450327B1

(12) United States Patent
Kikuchi

(10) Patent No.: US 6,450,327 B1
(45) Date of Patent: Sep. 17, 2002

(54) PAPER PALETTE FOR ART

(75) Inventor: Toshiro Kikuchi, Saitama (JP)

(73) Assignee: Sun-K Co., Ltd., Tokyo (JP)

(*) Notice: Subject to any disclaimer, the term of this patent is extended or adjusted under 35 U.S.C. 154(b) by 0 days.

(21) Appl. No.: 09/625,147

(22) Filed: Jul. 25, 2000

(30) Foreign Application Priority Data

Nov. 12, 1999 (JP) .......................................... 11-322404

(51) Int. Cl.[7] .............................. B44D 3/02; G01J 3/52; G09B 19/00

(52) U.S. Cl. ........................ 206/1.7; 206/575; 356/421; 434/98

(58) Field of Search ........................... 434/84, 98, 103, 434/104; 206/575, 1.7, 1.8, 1.9; 356/402, 423, 422, 421

(56) References Cited

U.S. PATENT DOCUMENTS 1,360,085 A * 11/1920 Bradley ...................... 206/1.9
3,815,265 A * 6/1974 DePauw ...................... 206/1.7
3,856,136 A * 12/1974 Governale .................. 206/1.7
4,337,046 A * 6/1982 Anderson et al. ........... 434/103
4,992,050 A * 2/1991 Edwards ....................... 434/98
5,743,407 A * 4/1998 Williams .................... 206/575
5,842,866 A * 12/1998 Chow .......................... 434/98

* cited by examiner

*Primary Examiner*—Bryon P. Gehman
(74) *Attorney, Agent, or Firm*—Flynn, Thiel, Boutell & Tanis, P.C.

(57) ABSTRACT

A paper palette for art used for mixing colors and other paints for art or arranging the point of a brush is formed by partially bundling plural pieces of paper. Each of the pieces of paper is colored in two or more tones, which enables one to match the colors delicately and accurately in relation to a color of surroundings or a color applied to a substrate. With this paper palette, one does not have to wash it after use.

9 Claims, 2 Drawing Sheets

PAPER PALETTE FOR ART

FIELD OF THE INVENTION

This invention relates to a palette used for mixing colors and the like in the field of art. More specifically, it relates to a paper palette formed by bundling rectangular pieces of paper.

BACKGROUND OF THE INVENTION

In the field of art with coloring as typified by paintings, a palette made of plastics, wood, marble or paper has been used for color matching of pigments, such as water or oil colors, or for arranging a point of a paintbrush. Of these, a paper palette is formed by bundling rectangular pieces of paper.

This paper palette, unlike other plastic palettes, does not need to wash after every use, and only the piece of paper used is discarded. Accordingly, it has been widely used as a convenient material for art. The prior art paper palettes are formed using pieces of white paper to match the product to be painted, such as a canvas.

However, in case of drawing or painting, a painter may wish to match the color to that of the surroundings or that applied to a substrate, rather than matching it to a canvas or the like. The mixing cannot be done satisfactorily with a white palette, especially in the field of tole painting, when wood of furniture or the like is colored, first, undercoating is applied, and a picture, a pattern or the like is then drawn in many cases. When undercoating is applied having a dark color, it is difficult to match the colors with a white palette.

SUMMARY OF THE INVENTION

Accordingly, the present invention provides, upon solving the ordinary problems, a palette in which pigments are mixed as desired and which dispenses with a labor of washing in every use.

The paper palette is formed by bundling pieces of paper, and each of the pieces of paper is colored in two or more tones.

possible configurations for the paper palette include a circle, oval and various polygonal forms. However, for ease of production a rectangle is preferred. That is, if a paper palette for art formed by bundling pieces of paper at a straight edge, each piece of paper having this straight edge and two color tones, it is easier to produce.

The invention provides a method of mixing pigments for art or arranging the point of a brush on a paper palette, formed by partially bundling pieces of paper, each of them being colored in two or more tones. The paper sheet has at least two separate regions colored in different tones. For example, the sheet in FIG. 1 is divided into two rectangular regions. Using the appropriate region enables a painter to know a resulting color of mixed paints on the palette before he or she actual paints.

On the above-described paper palette, the pigments are mixed in a portion having a tone close to that of a product to be painted, such as a canvas, wood or the like or that for undercoating. Consequently, the product to be painted is painted in tones closer to tones of an image. That is, when white or light colors are used for side-loading, the desired blending can be easily identified in the darker region of piece of paper. The piece of paper can be colored by separately coloring the same in two or more tones or by shading a boundary of tones. In particular, such a paper palette is preferably used in the field of tole painting.

When the pieces of paper are colored in tones as shown in FIG. 1, it is advisable that a darker tone, namely a blackish tone occupies an area of 20 to 40% of the overall piece of paper. A material to be colored, such as paper, a canvas, wood or the like has a whitish tone in many cases. When the darker tone occupies an area of 20 to 40% of the overall piece of paper in the toning in relation to such a white product to be colored, the overall piece of paper can be used effectively.

Furthermore, each of the above-described pieces of paper is colored in a blackish tone and a whitish tone. It is advisable that the blackish tone is adjusted such that the difference in gray scale with the whitish tone is between 55 and 85%. When the blackish portion is lightened, the mixing is done more easily with a darker pigment (for example, pure black).

In an alternative embodiment, the pieces of paper are each subjected to surface treatment for preventing permeation of a solvent for various types of pigments. The solvent includes, but not limited to, water for water colors, a dilute solution used for oil colors and the like. The surface treatment is applied to the pieces of paper by any known method which is employed for imparting oil resistance, water resistance and/or water impermeability in paper-making industry. One method includes coating a plastic material on the surface of the piece of paper. Another includes adhering a plastic sheet to it.

It is advantageous that the pieces of paper constituting the paper palette are bundled at any one long side and each of the pieces of paper is colored to adjoin at a transverse boundary as shown in FIG. 1. This configuration enables one to cut a single sheet of paper transversely and bind the resulting pieces as shown in FIG. 3.

The invention also provides a method of making a paper palette include: providing a plurality of pieces of paper, each piece of paper having a plurality of tones; and bundling the pieces of paper on one side. A preferred method of making a paper palette includes: providing a piece of paper having two adjacent tones running down a length of the paper; cutting the paper transversely into shorter lengths of paper; and binding the shorter lengths of paper. More preferably, the step of providing a piece of paper includes providing a rectangular piece of paper, and the step of binding the shorter lengths of paper includes binding the shorter lengths of paper on a long side.

The invention further provides a method of mixing colors including: providing a piece of paper with at least two different tones; placing at least one pigment on at least one of the different tones; and examining an appearance of the pigment on at least one of the different tones to determined if an additional pigment is necessary. The method may further include placing the additional pigment on the pigment and mixing the additional pigment therewith.

Furthermore, the invention provides a method of matching colors including: providing a paper palette having a plurality of pieces of paper bundled on one side, each piece of paper having an area of whitish tone and an area of darker tone; placing a pigment on one of the pieces of paper; and tearing off the piece of paper upon which the pigment was put.

DETAILED DESCRIPTION

Figure 1:
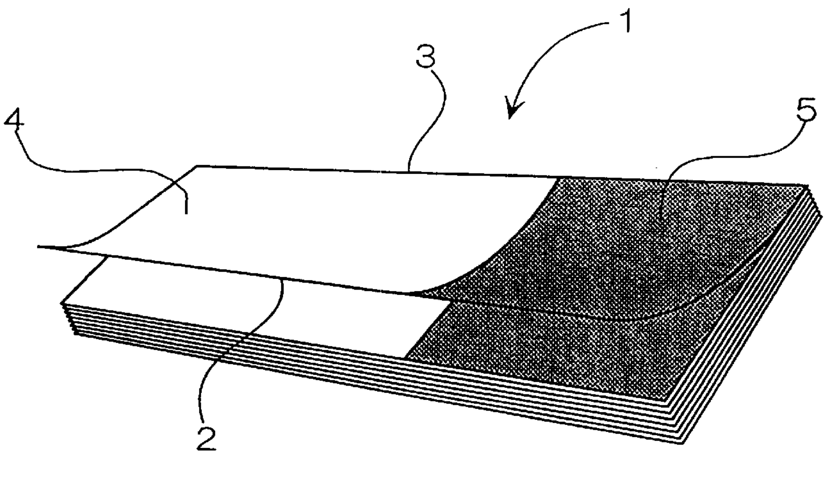
FIG. 1 is a perspective view showing a paper palette in one embodiment of this invention.

The paper palette for art of this invention is described below based on embodiments shown in the drawings. FIG. 1 is a perspective view showing one embodiment of this invention, the paper palette.

A paper palette 1 is formed by overlaying rectangular pieces of paper 2, specifically in tanzaku form or an oblong strip, and bundling them at the long side 3 with an adhesive or the like. The pieces of paper 2 are colored separately in two tones, namely in a whitish portion 4 and a blackish portion 5 containing 30% of a white pigment. Both of the pigments are separately applied to adjoin on the pieces of paper 2 as shown in FIG. 1. That is, in the paper palette 1 shown in this embodiment, the pieces of paper 2 constituting the same are colored in a whitish tone and a blackish tone with a difference in gray scale of 70%. In this manner, approximately 30% of a white pigment is incorporated into the black portion 5, making it possible to match colors or identify a desired shape even with a dark pigment.

Figure 2:
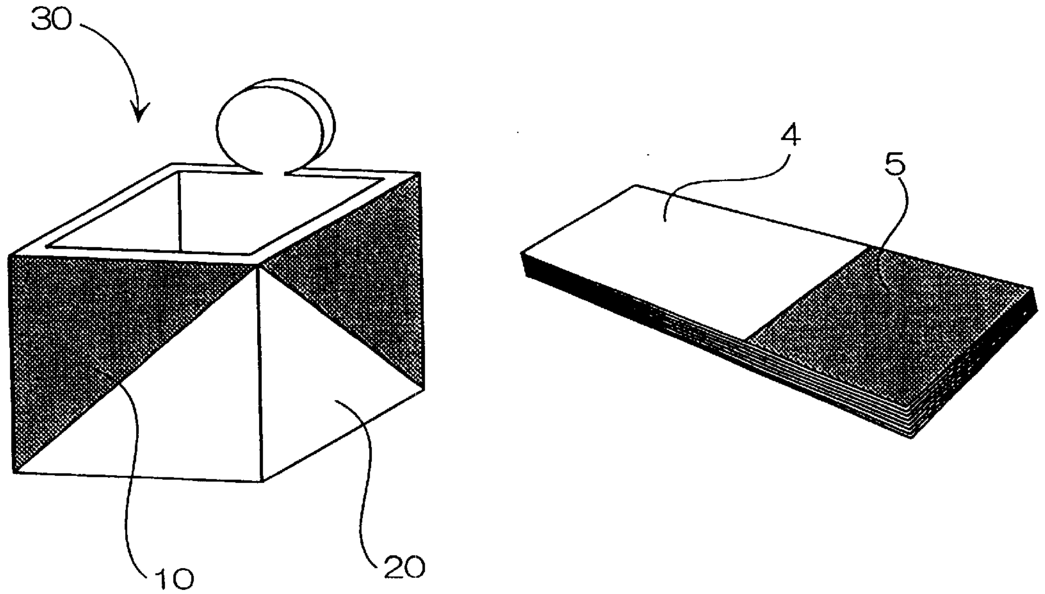
FIG. 2 is a perspective view showing a use state of the paper palette shown in FIG. 1.

In an alternative embodiment, the blackish portion occupies an area of approximately 35% of the overall piece of paper 2, and the whitish portion 4 occupies an area of 65% of the overall piece of paper. This makes it possible that, as shown in FIG. 2, for example, when a portion 10 of a product undercoated in a dark tone, such as a box for tiny goods 30 to be colored, the pigments are mixed on the blackish portion 5 of this piece of paper 2, and that when a portion 20 having a color of wood itself or undercoated in light color, the pigments are mixed in the whitish portion 4 of the piece of paper. Consequently, the pigments are mixed on the same background as the product 30 on the palette 1 (specifically, the pieces of paper 2) to complete the work according to the image.

In this embodiment, the pieces of paper 2 constituting the paper palette 1 are colored in two different tones, a whitish tone and a blackish tone. In addition, the pieces of paper also have a space between portions of these tones is colored in neutral tone, such as gray. Furthermore, it is also possible to mix the colors by shading the space between adjacent portion of these tones. In this case, matches of the colors are improved more delicately.

Figure 3:
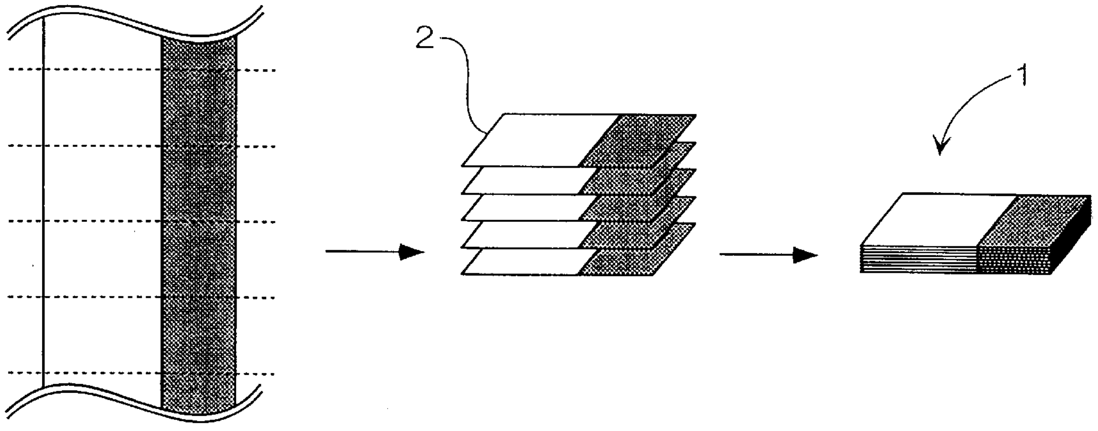
FIG. 3 is a flow chart showing a method of producing the paper palette shown in FIG. 1.

The paper palette 1 shown in FIG. 1 may be produced by, for example, a method shown in FIG. 3. That is, one end of an original sheet shaped in strip form is first having blackish tone containing 30% of the whitish tone along the lengthwise direction, and subjected to surface treatment for preventing permeation of pigments. The original sheet is cut to a predetermined length (according to a broken line in the drawing) to form the pieces of paper 2 constituting the paper palette 1. The pieces of paper 2 are overlaid and bundled at the long side 3 using an adhesive or the like to complete the paper palette 1 shown in FIG. 1. In this formation, paper palettes having various sizes are provided by changing the cutting length. Furthermore, even when changing the cutting length, the relation of the ratios and the positions of the whitish and blackish portions is always kept constant. That is, assuming a paper pallet is formed of pieces of paper in which a whitish portion and a blackish portion adjoin transversely, an original sheet in strip form has to be colored in a stripe pattern according to a cutting length, making it difficult to freely change the size of the paper palette. Further, the pieces of paper 2 are bundled at the long side 3, making it possible to bind securely the pieces of paper 2.

The paper palette of this invention is a paper palette for art which enables one to mix pigments delicately and accurately in relation to a color of the surroundings or a color applied to a substrate. When the pieces of paper are bundled at any one long side and colored in two tones with a transverse boundary, the palette is easier to produce. Furthermore, it does not require washing after every use, because the used pieces of paper can be discarded.

What I claim is:

1. A paper palette for art for mixing colors and arranging the bristles of a brush, said paper palette comprising a plurality of pieces of paper bundled together, each of the pieces of paper having at least a light tone and a dark tone provided thereon, the dark tone occupying an area of 20 to 40% of a side of each of the pieces of paper and the dark tone and the light tone having a 55 to 85% difference in grey scale.

2. The paper palette according to claim 1, wherein the pieces of paper are shaped rectangularly.

3. The paper palette according to claim 2, wherein the pieces of paper are attached to each other at a long side and the light tone and dark tone are adjacent each other.

4. The paper palette according to claim 1, wherein each of the pieces of paper are subjected to a surface treatment to prevent permeation of a solvent.

5. The paper palette of claim 1 where the light tone and the dark tone are provided adjacent to each other along the longitudinal direction of the palette.

6. A method of making a paper palette comprising the steps of:

providing a plurality of pieces of paper, each of the pieces of paper having a side with a light tone and a dark tone provided thereon, the dark tone occupying an area of 20 to 40% of a side of each of the pieces of paper and the dark tone and the light tone having a 55 to 85% difference in grey scale; and attaching the plurality of pieces of paper to each other at one side thereof.

7. A method of making a palette comprising the steps of:

providing a piece of paper having a light tone and a dark tone provided adjacent to each other and running along the length of a side of the paper, the dark tone occupying an area of 20 to 40% of the side of the paper and the dark tone and the light tone having a 55 to 85% difference in grey scale;

cutting the paper transversely into shorter lengths of paper; and binding the shorter lengths of paper along a side thereof.

8. The method of claim 7, wherein the piece of paper has a rectangular shape.

9. The method of claim 7, wherein the shorter lengths of paper are binded along a long side thereof.

* * * * *

UNITED STATES PATENT AND TRADEMARK OFFICE
CERTIFICATE OF CORRECTION

PATENT NO. : 6,450,327 B1
DATED : September 17, 2002
INVENTOR(S) : Thomas N. Meyer et al.

It is certified that error appears in the above-identified patent and that said Letters Patent is hereby corrected as shown below:

Title page,
Item [73], Assignee, insert -- Alcoa Inc., Pittsburgh, PA (US) --

Column 4,
Line 26, “compound. cast” should read -- compound cast --.

Column 9,
Line 64, “bottom. side” should read -- bottom side --.

Column 11,
Line 64, “method farther” should read -- method further --.

Column 12,
Line 57, “molten.” should read -- molten --.

Signed and Sealed this

Eighteenth Day of February, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,450,327 B1
DATED : September 17, 2002
INVENTOR(S) : Toshiro Kikuchi It is certified that error appears in the above-identified patent and that said Letters Patent is hereby corrected as shown below:

This certificate supersedes Certificate of Correction issued February 18, 2003, the number was erroneously mentioned and should be vacated since no Certificate of Correction was granted.

Signed and Sealed this

Twelfth Day of August, 2003

JAMES E. ROGAN
*Director of the United States Patent and Trademark Office*